United States Patent Office 3,408,176
Patented Oct. 29, 1968

3,408,176
CHEMICAL CONTROL OF PIGWEED
Ralph P. Neighbors, Olathe, Kans., assignor to Gulf Research & Development Company, Pittsburgh, Pa., a corporation of Delaware
No Drawing. Filed June 27, 1966, Ser. No. 560,813
4 Claims. (Cl. 71—118)

ABSTRACT OF THE DISCLOSURE

Different species of pigweed (Amaranthus) are controlled in the presence of a variety of crops by applying to the locus of the weeds a herbicidally effective amount of p-nitrobenzohydroxamic acid, either in the form of the free acid or a salt thereof.

Description of invention

Various species of pigweed are common agricultural pests in nearly all inhabited areas of the North American continent and in warm temperate and tropical areas on other continents. *Amaranthus retroflexus* and *Amaranthus hybridus* are particularly common in the prairie lands of both the United States and Canada. In the dry plains and dry, warm sandy soil areas, *Amaranthus palmeri* and *Amaranthus powelii* are more common pests. Unfortunately the various species possess collectively the ability to adapt to almost any sort of soil and climate conditions which are suitable for growing crops.

Chemical methods are now in use for controlling many weeds in the presence of growing crops. However, most herbicides which are safe for use with broad-leaved crops are relatively ineffective against pigweed. There is no completely effective chemical method of combating pigweed, for instance, in sugar beet fields.

It has now been discovered that p-nitrobenzohydroxamic acid and its salts are specifically effective against pigweed and are remarkably non-toxic to both broad-leaved and grass-like crop plants. The active compound, p-nitrobenzohydroxamic acid, is old and well known (Beilstein, IX, p. 398). The compound may be made conveniently by reaction of p-nitrobenzoyl chloride or a p-nitrobenzoate ester with hydroxyamine, or by various other methods, as disclosed in Chemical Reviews vol. 33, p. 225 (1943). Testing of a number of compositions of very similar chemical structure indicates that the specific effectiveness against pigweed is a property not possessed to a comparable degree by closely related compounds. A reasonable conclusion from the evidence available is that the critical factor is a specific step in one of the biochemical processes in Amaranthus species, rather than any obvious chemical characteristic of p-nitrobenzohydroxamic acid. Interference with either the synthesis or action of a particular enzyme appears to be a likely possibility. Pigweed plants which are treated with the substance do not exhibit growth abnormalities, so that hormone activity does not appear probable. In the absence of more detailed information the mechanism of the specific herbicidal activity remains unexplained.

The following examples illustrate the practice of the method of this invention.

EXAMPLE 1

An aqueous dispersion of p-nitrobenzohydroxamic acid was prepared by first dissolving the compound in dimethyl formamide and adding a dispersing agent (Emcol AD 506) to yield an emulsifiable concentrate containing 1 lb. per gallon of active ingredient. The emulsifiable concentrate was then mixed with water to form spray mixtures which could be conveniently applied at rates of 4, 2, 1 and ½ lb./acre at a spray volume of about 20 gallons per acre. Half of the spray mixtures were made basic with sodium hydroxide, so that the herbicide was applied in the form of the sodium salt.

Pigweed (*Amaranthus retroflexus*), sugar beets, green foxtail and lambsquarters, were planted in 4 inch pots in the greenhouse. About 10 to 18 days after emergence of the plants, duplicate pots were sprayed with the aqueous dispersions as described above. The pots were put back on the greenhouse bench and allowed to remain under normal growing conditions for a week, after which they were examined and rated according to the following scale:

N—necrosis. G—growth inhibition.
0=no effect.
1=slight effect.
2=moderate effect.
3=severe effect.
4=all plants died.

Results are tabulated below.

POST EMERGENT USE OF 4-NITROBENZOHYDROXAMIC ACID AS A HERBICIDE

| Formulation | Rate (lb./A.) | Pigweed | Sugar Beets | Green Foxtail | Lambs-quarter |
|---|---|---|---|---|---|
| 1 lb./gal. active ingredient | 4 | N4 | 0 | N1 | N1 |
|  | 2 | N4 | 0 | N1 | N1 |
| DMF and Emcol AD506 | 1 | N4 | 0 | 0 | N1 |
|  | ½ | N4 | 0 | 0 | 0 |
| 1 lb./gal. active ingredient | 4 | N4 | 0 | N1 | N3G3 |
| DMF and Emcol | 2 | N4 | 0 | 0 | N1 |
| AD506 plus NaOH | 1 | N4 | 0 | 0 | 0 |
| To basic pH | ½ | N4 | 0 | 0 | 0 |

The freedom from injurious effects on sugar beets at the indicated rates of application is an unusual and very desirable effect, which is also obtained with many other crops, including soybeans, alfalfa, oats, radishes and wheat. Because of the selective effectiveness of the method of this invention, the preferred use is in the form of a sodium, potassium or ammonium salt in combating pigweed in the presence of crops which are known to be sensitive to ordinary herbicides. A particularly desirable use is in combination with other herbicides which, although safe on the crop plants, are deficient with respect to effectiveness on pigweed. A specifically preferred use is in combating weeds in sugar beet fields by applying to the locus of the weeds, at a rate of from about ¼ to 5 pounds per acre, a compound selected from the group consisting of p-nitrobenzohydroxamic acid and salts thereof and at a rate of from about ½ to 6 pounds per acre a compound selected from the group consisting of benzamido-oxyacetic acid and salts thereof. This combination of methods controls both Amaranthus and Kochia species, as well as other weeds in sugar beets. The effectiveness on pigweed of the combination of herbicides appears to be greater than additive, which suggests that the two herbicides operate by different biochemical mechanisms. The overall control of other weeds also is better than would be expected, based on tests with either herbicide used alone, but the reason for this is not apparent. The combined use of the two herbicides may be carried out in the same or in different spray formulations. If the growth of weeds is varying or spotty, it may be more convenient and desirable to use separate formulations and only apply each one or both where necessary.

What is claimed is:

1. The method of combating pigweed which comprises post emergently applying to the locus of the weeds a herbicidally effective amount of a compound selected from the group consisting of p-nitrobenzohydroxamic acid and ammonium, sodium and potassium salts thereof.

2. The method according to claim 1 in which the ammonium salt of p-nitrobenzohydroxamic acid is applied to the locus of the weeds.

3. The method according to claim 1 in which the sodium salt of p-nitrobenzohydroxamic acid is applied to the locus of the weeds.

4. The method according to claim 1 in which the potassium salt of p-nitrobenzohydroxamic acid is applied to the locus of the weeds.

References Cited

UNITED STATES PATENTS

| | | | |
|---|---|---|---|
| 3,056,669 | 10/1962 | Moyle et al. | 71—115 |
| 3,165,392 | 1/1965 | Koopman | 71—121 |
| 3,234,255 | 2/1966 | Hackmann | 71—121 |
| 3,236,871 | 2/1966 | Hinman et al. | 71—66 |

OTHER REFERENCES

Exner et al.: "Acyl Derivatives of Hydroxylamine" (1965), C.A. vol. 63, 1965.

LEWIS GOTTS, *Primary Examiner.*

J. O. THOMAS, JR., *Examiner.*

G. HOLLRAH, *Assistant Examiner.*